United States Patent
Liu

(10) Patent No.: US 11,023,217 B2
(45) Date of Patent: Jun. 1, 2021

(54) SYSTEMS AND METHODS FOR SUPPORT OF SELECTIVE PROCESSOR MICROCODE UPDATES

(71) Applicant: Dell Products L.P., Round Rock, TX (US)

(72) Inventor: Wei G. Liu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/185,260

(22) Filed: Nov. 9, 2018

(65) Prior Publication Data
US 2020/0150945 A1    May 14, 2020

(51) Int. Cl.
  *G06F 8/65*     (2018.01)
  *G06F 9/4401*   (2018.01)
(52) U.S. Cl.
  CPC .............. *G06F 8/65* (2013.01); *G06F 9/4403* (2013.01)
(58) Field of Classification Search
  CPC ................................. G06F 8/65; G06F 9/4403
  See application file for complete search history.

(56) References Cited

U.S. PATENT DOCUMENTS

| | | | | |
|---|---|---|---|---|
| 6,704,864 B1 * | 3/2004 | Philyaw | ................ | G06F 9/4411 713/1 |
| 7,660,977 B2 * | 2/2010 | Zimmer | .................... | G06F 8/65 713/1 |
| 8,099,552 B2 * | 1/2012 | Franklin | .................... | G06F 8/60 711/114 |
| 8,245,216 B2 * | 8/2012 | Felts | ......................... | G06F 8/65 717/169 |
| 8,601,463 B2 * | 12/2013 | Bouchier | .................. | G06F 8/65 717/170 |
| 8,713,687 B2 * | 4/2014 | Sobel | ..................... | G06F 21/125 726/26 |
| 8,873,428 B1 * | 10/2014 | Orr | ........................ | H04L 41/082 370/254 |
| 9,716,584 B2 * | 7/2017 | Dubeuf | ................. | H04L 9/3066 |
| 10,175,971 B2 * | 1/2019 | Oshima | ................... | H04L 67/34 |

(Continued)

OTHER PUBLICATIONS

Terry Myerson, "Understanding the performance impact of Spectre and Meltdown mitigations on Windows Systems", Jan. 9, 2018, (Year: 2018).*

(Continued)

*Primary Examiner* — Douglas M Slachta
(74) *Attorney, Agent, or Firm* — Jackson Walker L.L.P.

(57) ABSTRACT

An information handling system may include a plurality of processors, a basic input/output system (BIOS) comprising a program of instructions executable by one or more of the plurality of processors configured to, when executed, cause the one or more of the plurality of processors, to initialize one or more information handling resources of the information handling system, wherein the BIOS is further configured to receive a user selection of respective microcode versions desired to be loaded on each of the plurality of processors and cause each of the plurality of processors to load a respective microcode version in accordance with the user selection such that the respective microcode version loaded by a first of the plurality of processors is different than the respective microcode version loaded by a second of the plurality of processors.

18 Claims, 2 Drawing Sheets

(56) References Cited

U.S. PATENT DOCUMENTS

| | | | | |
|---|---|---|---|---|
| 2002/0073304 A1* | 6/2002 | Marsh | G06F 8/65 | 713/1 |
| 2006/0218334 A1* | 9/2006 | Spry | G06F 13/1615 | 710/309 |
| 2008/0028368 A1* | 1/2008 | Depew | G06F 8/65 | 717/120 |
| 2008/0215727 A1* | 9/2008 | Denis | H04L 41/06 | 709/224 |
| 2008/0307157 A1* | 12/2008 | Jang | G06F 8/65 | 711/103 |
| 2010/0049961 A1* | 2/2010 | Liao | G06F 8/65 | 713/2 |
| 2010/0115202 A1* | 5/2010 | Zimmer | G06F 8/60 | 711/118 |
| 2010/0218178 A1* | 8/2010 | Sakai | G06F 8/65 | 717/170 |
| 2011/0131403 A1* | 6/2011 | Ibrahim | G06F 21/572 | 713/2 |
| 2012/0075469 A1* | 3/2012 | Oskin | H04N 21/23439 | 348/143 |
| 2012/0102477 A1* | 4/2012 | Kim | G06F 8/654 | 717/169 |
| 2014/0123124 A1* | 5/2014 | Gray | G06F 8/654 | 717/170 |
| 2014/0173581 A1* | 6/2014 | Grinberg | G06F 8/654 | 717/170 |
| 2014/0282486 A1* | 9/2014 | Hisamoto | G06F 8/65 | 717/173 |
| 2014/0372560 A1* | 12/2014 | Spottswood | H04L 67/34 | 709/217 |
| 2015/0143098 A1* | 5/2015 | Arnold | G06F 8/654 | 713/2 |
| 2015/0227358 A1* | 8/2015 | Lavoie | G06Q 50/06 | 717/173 |
| 2015/0227388 A1* | 8/2015 | Liang | G06F 9/4818 | 718/107 |
| 2016/0034268 A1* | 2/2016 | Brown | G06F 8/654 | 717/169 |
| 2017/0003956 A1* | 1/2017 | Chang | G06F 8/654 | |
| 2019/0171436 A1* | 6/2019 | Shivanna | G06F 8/65 | |
| 2019/0243631 A1* | 8/2019 | Sharma | G06F 8/71 | |
| 2019/0294461 A1* | 9/2019 | Woods | G06F 16/14 | |

OTHER PUBLICATIONS

Tom Warren, "Microsoft reveals how Spectre updates can slow your PC down", Jan. 9, 2018, (Year: 2018).*

* cited by examiner

SYSTEMS AND METHODS FOR SUPPORT OF SELECTIVE PROCESSOR MICROCODE UPDATES

TECHNICAL FIELD

The present disclosure relates in general to information handling systems, and more particularly to systems and methods for support of selective processor microcode updates in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In an information handling system with multiple processors, each processor may be required to support an enhanced microcode update feature whereby processor microcode, which effectively serves as firmware for a processor, is updated in order to correct for bugs, correct for security risks, and/or correct other shortcomings of a processor and/or its earlier versions of microcode after shipment of an information handling system for its intended end use.

In some implementations, in order to support large microcode updates, a basic input/output system (BIOS) may need to load microcode twice per logical processor during processor initialization—once before cache of the processor is enabled to allow any cache-related erratum to be fixed, and again after a System Management Mode (SMM) Relocation handler has executed in order to allow certain classes of uncore fixes to be applied.

In most implementations, microcode updates do not persist across reboots. Accordingly, most original equipment manufacturers of information handling systems make the microcode update part of the BIOS update of the information handling system, such that the new microcode is integrated into the BIOS image, and the same microcode is loaded on every processor that has the same family/model/stepping values during power-on/self-test (POST) of the information handling system.

A downside of microcode fixes, including those intended to correct security vulnerabilities, is that they may lead to a decrease in processor performance. Accordingly, end users of an information handling system may have to absorb this performance penalty even though some of their processing workloads may be security-sensitive and thus may require the security fixes.

SUMMARY

In accordance with the teachings of the present disclosure, the disadvantages and problems associated with microcode updates may be substantially reduced or eliminated.

In accordance with embodiments of the present disclosure, an information handling system may include a plurality of processors, a basic input/output system (BIOS) comprising a program of instructions executable by one or more of the plurality of processors configured to, when executed, cause the one or more of the plurality of processors, to initialize one or more information handling resources of the information handling system, wherein the BIOS is further configured to receive a user selection of respective microcode versions desired to be loaded on each of the plurality of processors and cause each of the plurality of processors to load a respective microcode version in accordance with the user selection such that the respective microcode version loaded by a first of the plurality of processors is different than the respective microcode version loaded by a second of the plurality of processors.

In accordance with these and other embodiments of the present disclosure, a method may include causing a basic input/output system (BIOS) comprising a program of instructions executable by one or more of a plurality of processors configured to, when executed, cause the one or more of the plurality of processors, to initialize one or more information handling resources of an information handling system, receive a user selection of respective microcode versions desired to be loaded on each of the plurality of processors, and cause each of the plurality of processors to load a respective microcode version in accordance with the user selection such that the respective microcode version loaded by a first of the plurality of processors is different than the respective microcode version loaded by a second of the plurality of processors.

In accordance with these and other embodiments of the present disclosure, an article of manufacture may include a non-transitory computer readable medium and computer-executable instructions carried on the computer readable medium, the instructions readable by one or more of a plurality of processors, the instructions, when read and executed, for causing the one or more processors to, execute a basic input/output system (BIOS) comprising a program of instructions executable by one or more of the plurality of processors and configured to initialize one or more information handling resources of an information handling system, receive a user selection of respective microcode versions desired to be loaded on each of the plurality of processors, and cause each of the plurality of processors to load a respective microcode version in accordance with the user selection such that the respective microcode version loaded by a first of the plurality of processors is different than the respective microcode version loaded by a second of the plurality of processors.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
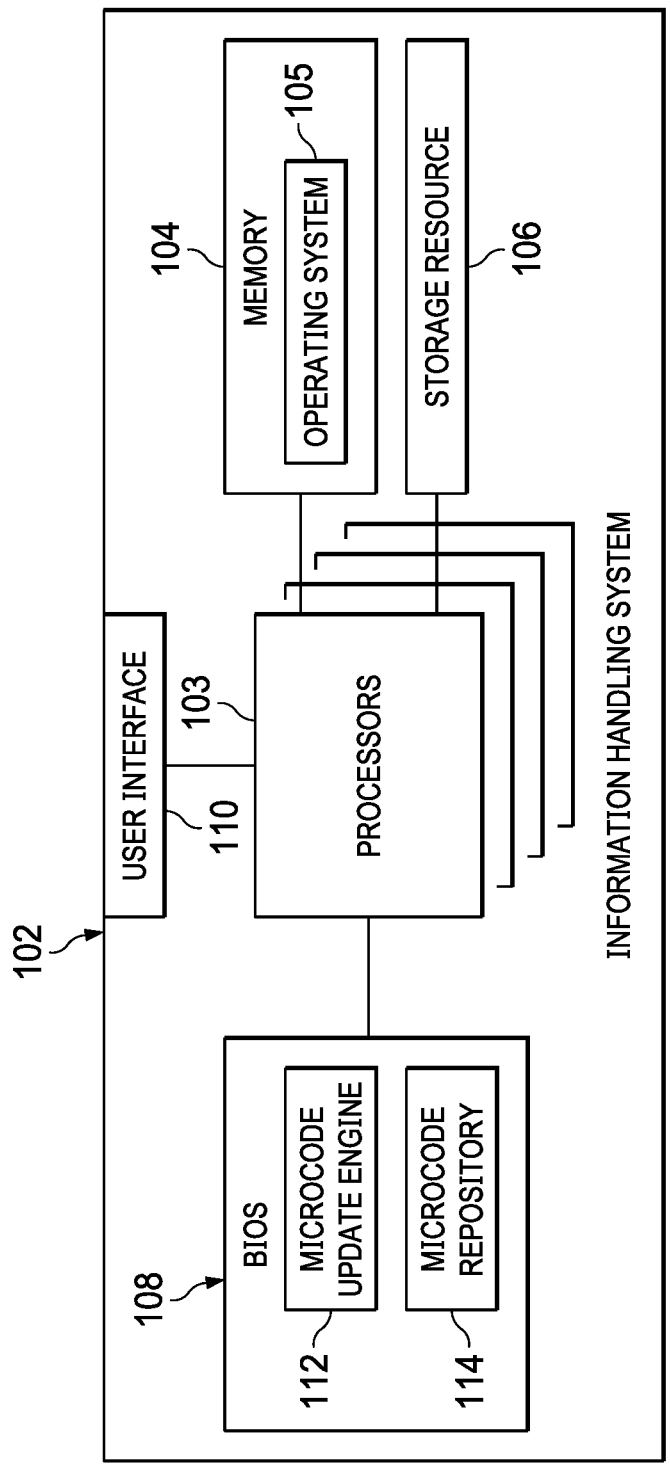
FIG. 1 illustrates a block diagram of an example information handling system, in accordance with the present disclosure.
Figure 2:
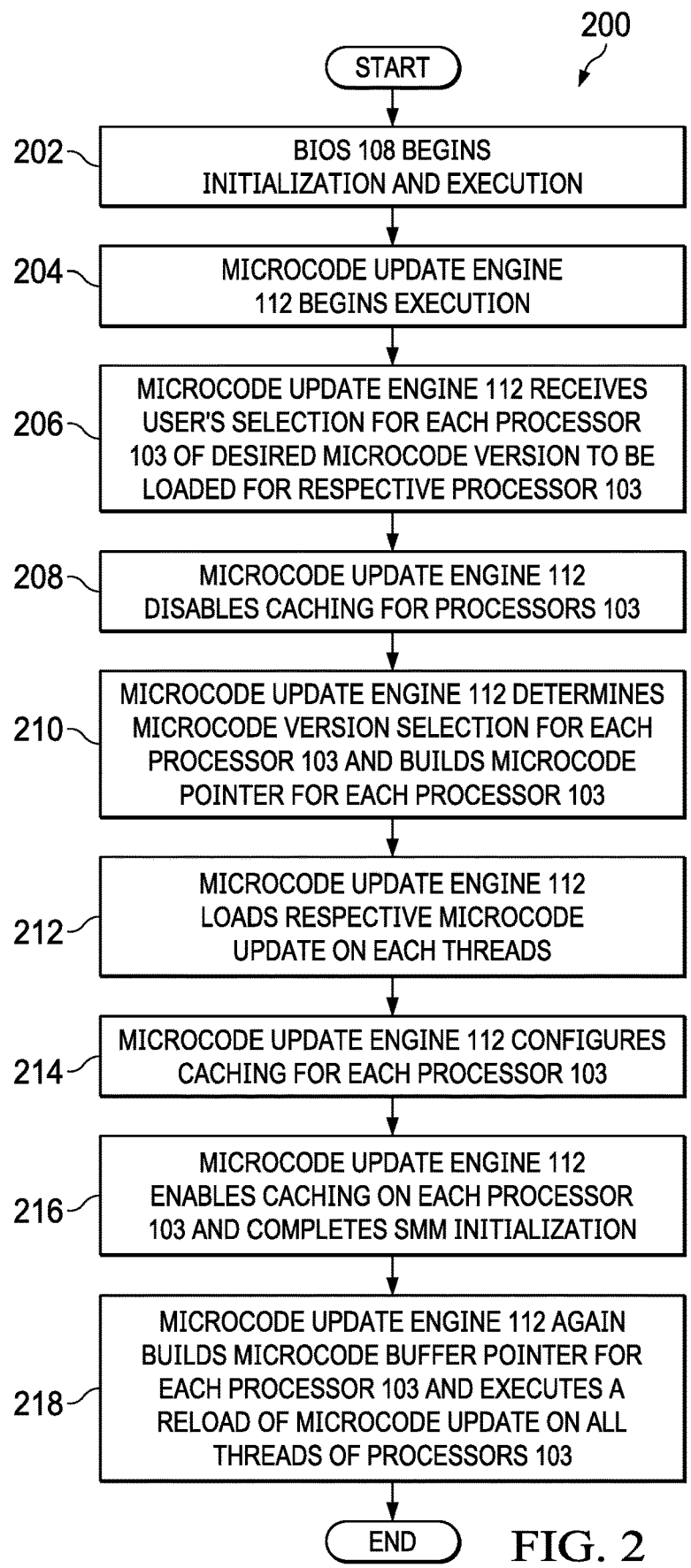
FIG. 2 illustrates a flow chart of an example method for support of selective processor microcode updates, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages; electro-mechanical devices (e.g., air movers), displays, and power supplies.

FIG. 1 illustrates a block diagram of an example information handling system 102, in accordance with the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, an information handling system 102 may be a portable computing device (e.g., a laptop, notebook, tablet, handheld, smart phone, personal digital assistant, etc.). In yet other embodiments, information handling system 102 may comprise a storage enclosure configured to house a plurality of physical disk drives and/or other computer-readable media for storing data. As shown in FIG. 1, information handling system 102 may comprise a plurality of processors 103, one or more memories 104 communicatively coupled to processors 103, a BIOS 108 communicatively coupled to processors 103, one or more storage resources 106 communicatively coupled to processors 103, and a user interface 110 communicatively coupled to processors 103.

A processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, a processor 103 may interpret and/or execute program instructions and/or process data stored in memory 104, storage resource 106, and/or another component of information handling system 102.

Memory 104 may be communicatively coupled to processors 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have operating system 105 stored thereon. Operating system 105 may be any program of executable instructions, or aggregation of programs of executable instructions, configured to manage and/or control the allocation and usage of hardware resources (e.g., processor 103, memory 104, user interface 110, and/or other information handling resources) and provide an interface between such hardware resources and application programs hosted by operating system 105, and thus may act as a host for application programs to be executed by information handling system 102. Active portions of operating system 105 may be read and executed by processor 103 in order to carry out the functionality of operating system 105. Examples of operating system 105 may include, without limitation, Windows, MacOS, UNIX, LINUX, Android, iOS, or any other closed or open source operating system.

Storage resource 106 may be communicatively coupled to processors 103 and may include any system, device, or apparatus operable to store information processed by processors 103. Storage resource 106 may include, for example, one or more direct access storage devices (e.g., hard disk drives). Although storage resource 106 is shown as internal to information handling system 102 in FIG. 1, in some embodiments storage resource 106 may be external to information handling system 102.

BIOS 108 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 108 may be implemented as a program of instructions that may be read by and executed on processor 103 to carry out the functionality of BIOS 108. In these and other embodiments, BIOS 108 may comprise boot firmware configured to be the first code executed by processor 103 when information handling system 102 is booted and/or powered on. As part of its initialization functionality, code for BIOS 108 may be configured to set components of information handling system 102 into a known state, so that one or more applications (e.g., an operating system or other application programs) stored on compatible media (e.g., disk drives) may be executed by processor 103 and given control of information handling system 102.

As shown in FIG. 1, BIOS 108 may include a microcode update engine 112. Microcode update engine 112 may comprise a subset of instructions of BIOS 108 that may support user selection of a microcode version the user would prefer to load on each particular processor core, as described in greater detail below. In some embodiments, microcode update engine 112 may be implemented as a program of instructions that may be read by and executed on one or more processors 103 to carry out the functionality of microcode update engine 112.

As shown in FIG. 1, BIOS 108 may include a microcode repository 114. Microcode repository 114 may include a plurality of microcode images for processors 103, which may include a current version microcode image as well as one or more older version microcode images, wherein the one or more older version microcode images may include the most recent microcode images other than the current version microcode image.

User interface 110 may comprise any instrumentality or aggregation of instrumentalities by which a user may interact with information handling system 102. For example, user interface 110 may permit a user to input data and/or instructions into information handling system 102, and/or otherwise manipulate information handling system 102 and its associated components. User interface 110 may also permit information handling system 102 to communicate data to a user, e.g., by way of a display device. In some embodiments, user interface 110 may include a biometric input device (e.g., fingerprint scanner, retinal scanner, camera, microphone, etc.).

In addition to processor 103, memory 104, storage resource 106, BIOS 108, and user interface 110, information handling system 102 may include one or more other information handling resources.

In operation, unlike existing implementations in which a BIOS may carry only the latest microcode image, BIOS 108 may maintain within microcode repository 114 a plurality of versions of microcode images that may include microcode versions older than the latest, current microcode image available from a processor vendor. Furthermore, microcode update engine 112 of BIOS 108 may provide a user (e.g., via user interface 110) with one or more options for selecting which available microcode version stored in microcode repository 114 the user desires to load on each processor 103, as discussed in greater detail below. Based on such user selections, microcode update engine 112 may cause each processor 103 to load the microcode image selected by the user for such processor 103, also as discussed in greater detail below.

FIG. 2 illustrates a flow chart of an example method 200 for support of selective processor microcode updates, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, BIOS 108 may begin initialization and begin execution (e.g., in response to a boot or reboot of information handling system 102). During execution of BIOS 108, at step 204, microcode update engine 112 may begin execution. At step 206, microcode update engine 112 may receive (e.g., via user interface 110) a user's selection, for each processor 103, of a desired microcode version to be loaded for the respective processor 103. In some embodiments, such selection may be group-based, such that microcode update engine 112 allows a user to select the same microcode version for processors 103 having similar characteristics (e.g., vendor, model number, etc.). By default, the current microcode image may be selected for each processor. In some embodiments, microcode update engine 112 may hide the option to configure loading of different microcode versions on each processor and such selection may be limited to specialized commands (e.g., such as Remote Access Controller Admin or "RADADM" commands) to limit such option to more advanced users and/or users with advanced user privileges with respect to information handling system 102.

At step 208, microcode update engine 112 may disable caching for processors 103. Such disabling of caching prior to loading of microcode for the first time may be desirable in situations in which a processor cache has bugs that updated microcode is intended to fix. At step 210, microcode update engine 112 may determine the microcode version selection for each processor 103 and build a microcode pointer for each processor 103.

At step 212, microcode update engine 112 may load the microcode update on all threads, such that each processor 103 may execute a different microcode version. At step 214, microcode update engine 112 may configure caching for each processor 103. At step 216, microcode update engine 112 may enable caching on each processor 103 and complete SMM initialization. At step 218, microcode update engine 112 may again build a microcode buffer pointer for each processor 103 and execute a reload of the microcode update on all threads of processors 103.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented in whole or part using information handling system 102, and/or any other system operable to implement method 200. In certain embodiments, method 200 may be implemented partially or fully in software and/or firmware embodied in computer-readable media.

Advantageously, using the systems and methods described above, a user may have the option to select a desired microcode version for each individual processor 103. Thus, a user may choose to apply a current microcode image for processors 103 executing security-conscious workloads (e.g., security-conscious virtual machines), while using older microcode images for processors 103 executing workloads that require high performance but may not require the highest levels of security provided by the current microcode version.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
a plurality of processors disposed within a single chassis of a single computer system;
a basic input/output system (BIOS) comprising a program of instructions executable by one or more of the plurality of processors configured to, when executed, cause the one or more of the plurality of processors to initialize one or more information handling resources of the information handling system, wherein the BIOS is further configured to:
receive a user selection of respective microcode versions to be loaded on each of the plurality of processors; and
cause each of the plurality of processors to load a respective microcode version in accordance with the user selection such that the respective microcode version loaded by a first of the plurality of processors is different from the respective microcode version loaded by a second of the plurality of processors, wherein the respective microcode version loaded by the first of the plurality of processors includes a security fix that decreases performance, and wherein the respective microcode version loaded by the second of the plurality of processors does not include the security fix that decreases performance.

2. The information handling system of claim 1, wherein the BIOS is further configured to present to a user one or more options for user selection of respective microcode versions to be loaded on each of the plurality of processors.

3. The information handling system of claim 1, wherein the user selection indicates, for each individual processor, a selection of which microcode version is to be loaded on the individual processor.

4. The information handling system of claim 1, wherein the user selection indicates, for each individual group of a plurality of groups of the plurality of processors, which microcode version is to be loaded on processors of the individual group, wherein the processors of each individual group share at least one common characteristic.

5. The information handling system of claim 1, wherein the BIOS is further configured to store a repository of a plurality of microcode images, each microcode image being of a different version of microcode for the plurality of processors.

6. The information handling system of claim 5, wherein the BIOS is further configured to cause each of the plurality of processors to load its respective microcode version from the repository.

7. A method comprising:
a basic input/output system (BIOS) comprising a program of instructions executable by one or more of a plurality of processors disposed within a single chassis of a single computer system causing the one or more of the plurality of processors to:
initialize one or more information handling resources of the information handling system;
receive a user selection of respective microcode versions to be loaded on each of the plurality of processors; and
cause each of the plurality of processors to load a respective microcode version in accordance with the user selection such that the respective microcode version loaded by a first of the plurality of processors is different from the respective microcode version loaded by a second of the plurality of processors, wherein the respective microcode version loaded by the first of the plurality of processors includes a security fix that decreases performance, and wherein the respective microcode version loaded by the second of the plurality of processors does not include the security fix that decreases performance.

8. The method of claim 7, wherein the plurality of processors are a plurality of processor cores.

9. The method of claim 7, wherein the user selection indicates, for each individual processor, a selection of which microcode version is to be loaded on the individual processor.

10. The method of claim 7, wherein the user selection indicates, for each individual group of a plurality of groups of the plurality of processors, which microcode version is to be loaded on processors of the individual group, wherein the processors of each individual group share at least one common characteristic.

11. The method of claim 7, further comprising the BIOS storing a repository of a plurality of microcode images, each microcode image being of a different version of microcode for the plurality of processors.

12. The method of claim 11, further comprising the BIOS causing each of the plurality of processors to load its respective microcode version from the repository.

13. An article of manufacture comprising:
a non-transitory computer readable medium; and
computer-executable instructions carried on the computer readable medium, the instructions executable by one or more of a plurality of processors that are disposed within a single chassis of a single computer system to cause a basic input/output system (BIOS) of the information handling system to:
initialize one or more information handling resources of the information handling system;
receive a user selection of respective microcode versions to be loaded on each of the plurality of processors; and
cause each of the plurality of processors to load a respective microcode version in accordance with the user selection such that the respective microcode version loaded by a first of the plurality of processors is different from the respective microcode version loaded by a second of the plurality of processors, wherein the respective microcode version loaded by the first of the plurality of processors includes a security fix that decreases performance, and wherein the respective microcode version loaded by the second of the plurality of processors does not include the security fix that decreases performance.

14. The article of claim 13, the instructions for further causing the BIOS to present to a user one or more options for user selection of respective microcode versions to be loaded on each of the plurality of processors.

15. The article of claim 13, wherein the user selection indicates, for each individual processor, a selection of which microcode version is to be loaded on the individual processor.

16. The article of claim 13, wherein the user selection indicates, for each individual group of a plurality of groups of the plurality of processors, which microcode version is to be loaded on processors of the individual group, wherein the processors of each individual group share at least one common characteristic.

17. The article of claim 13, the instructions for further causing the BIOS to store a repository of a plurality of microcode images, each microcode image being of a different version of microcode for the plurality of processors.

18. The article of claim 17, the instructions for further causing the BIOS to cause each of the plurality of processors to load its respective microcode version from the repository.

* * * * *